E. F. SLEAR.
PUZZLE.
APPLICATION FILED JAN. 3, 1914.

1,103,442.

Patented July 14, 1914.

WITNESSES:
Agnes E. Caskey
Helen M. Byrne

INVENTOR.
Elias F. Slear
BY William J. Jackson
ATTORNEY.

UNITED STATES PATENT OFFICE.

ELIAS FREDERIC SLEAR, OF COLLINGSWOOD, NEW JERSEY.

PUZZLE.

1,103,442.  Specification of Letters Patent.  Patented July 14, 1914.

Application filed January 3, 1914.  Serial No. 810,228.

*To all whom it may concern:*

Be it known that I, ELIAS F. SLEAR, a citizen of the United States, and a resident of Collingswood, in the county of Camden and State of New Jersey, have invented a certain new and useful Puzzle, of which the following is a specification.

The principal objects of the present invention are to provide a puzzle which is popular, diverting and quaint and whereof the same is self-contained, neat, durable and comparatively inexpensive to manufacture; and whereof besides being interesting and puzzling to those manipulating the device, it further possesses the qualities of being capable of use as an advertising medium.

With these and other objects in view, the invention consists of the improvements hereinafter described and finally claimed.

Figure 1:
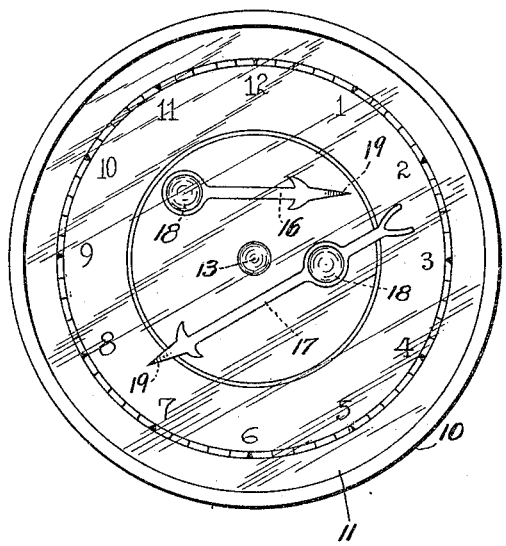
Figure 2:
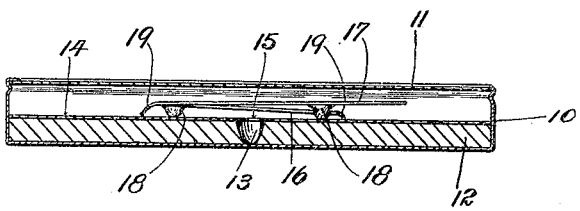
Figure 3:
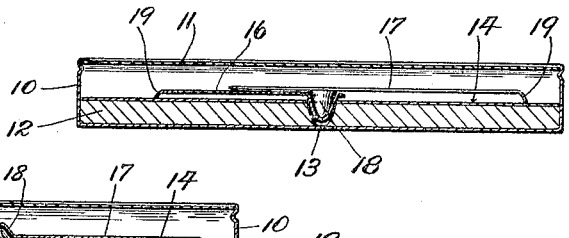
Figure 4:
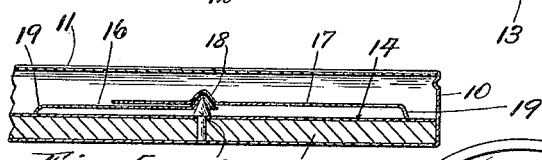
Figure 4:
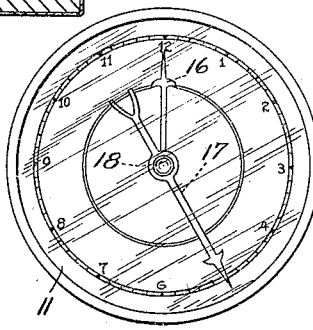

The nature, characteristic features and scope of the invention will be more fully understood from the following description taken in connection with the accompanying drawings forming part hereof and in which:

Figure 1, is a top or plan view of the puzzle embodying the invention and illustrating the parts thereof prior to solving the puzzle. Fig. 2, is a view in cross-section thereof. Fig. 3, is a similar view, illustrating the position of the parts when the puzzle is solved. Fig. 4, is a top or plan view, drawn to a reduced scale, illustrating a similar position, and Fig. 5, is a view in cross-section of a slightly modified form of puzzle.

In the drawings and with reference to Figs. 1 to 4, the puzzle is shown as comprising a circular box-like structure or casing 10, preferably of cardboard on account of its cheapness, which casing is provided with a glass, celluloid, isinglass or other transparent top or cover 11. The casing 10, is provided at its bottom with a built up disk-like portion 12, of any suitable material, as paper, the same being relatively thick and centrally provided with a recessed or depressed portion 13, which considered in plan, is circular and gradually tapers downwardly to a point. Shown in the drawings as being superimposed upon and fixed to the disk 12, is another disk 14, forming a dial which has delineated thereon letters, numerals or other characters. For illustrative purposes, a clock dial is shown which is also centrally apertured as at 15, which aperture registers with the aperture 13, in the disk 12. Loosely resting upon the dial 14, are the pointers or indexes of the puzzle and which as shown comprise an hour hand 16, and a minute hand 17. These pointers are independent of one another and are free to be moved over the dial face horizontally but as the space between the transparent cover 11, and the dial is relatively shallow, they cannot be bodily overturned. Each of the pointers or indexes is provided with a depending recessed protuberance 18. In practice, the pointers are preferably stamped from a suitable light weight metal and the protuberances 18, are formed in the stamping. The tip or point of each hand is bent or turned over as at 19, and such points together with the protuberances 18, serve to prevent the hands from lying flat upon the dial 14. Thus the pointers may be more easily moved over the dial face and when the same are in the position shown in Fig. 3, such bent or turned over tips rest upon the dial 14, and serve to retain the hands in coöperative horizontal position.

The object of the puzzle of course is to manipulate the same so as first, to cause the protuberance of the hour hand 16, to seat itself in the central depression 15—13; second, to cause the protuberance of the minute hand 17, to seat itself in the recessed protuberance of the hour hand and third, to further manipulate the puzzle to cause the hands to register the time of day. While it is comparatively easy to seat the protuberance of the hour hand in the recessed portion of the casing, it is quite difficult to cause the minute hand to be seated in the recessed protuberance of the hour hand and having accomplished this, it is still quite difficult to manipulate the puzzle so that the time of day may be registered without dislodging the hands from their coöperative positions. The hands are caused to assume such coöperative positions by gently tapping on the casing with the fingers, while the casing is slightly inclined. Ample surface is present upon the various parts of the puzzle for advertising matter which obviously is advantageous in a device of this character.

In the modified form of puzzle shown in Fig. 5, the construction is the same as that above described with this exception that the casing bottom is provided with a central, conical projection 20, and the pointers or indexes 16, and 17, are reversed so that the protuberances 18, project upwardly, the points 19, of course being reversed to track upon the dial 14. Thus the protuberance of the hour hand may be caused to seat itself over the projection 20, and the protuberance of the minute hand may be caused to seat itself over the protuberance of the hour hand.

What I claim is:

1. A puzzle comprising a casing the bottom of which has delineated thereon a dial depicting suitable characters and the top of which casing is provided with a transparent cover, said casing bottom being provided with a pointer receiving medium and a pair of freely movable independent pointers, shaped and proportioned for coöperative engagement with one another and with said medium upon proper manipulation of the casing.

2. A puzzle comprising a casing the bottom of which has delineated thereon a dial depicting suitable characters and the top of which casing is provided with a transparent cover, said casing bottom being provided with a central pointer receiving medium, and a pair of freely movable, independent pointers each of which is provided with a bent over point and a recessed protuberance of which the protuberance of one pointer is adapted to be seated with respect to said medium and of which the protuberance of the other pointer is adapted to be seated with respect to the protuberance of the first mentioned pointer upon proper manipulation of the casing.

3. A puzzle comprising a casing having a transparent cover, said casing being provided at its bottom with a central hand receiving medium, the casing bottom having delineated thereon a clock dial and a pair of hands shaped and proportioned for coöperatively engaging one another for accommodation by said medium under the influence of gravity upon manipulation of the casing.

4. A puzzle comprising a casing having a transparent cover, said casing being provided at its bottom with a central depression, the casing bottom having delineated thereon a clock dial and a pair of clock hands loosely accommodated between said cover and clock dial, each hand being provided with a turned over point and a recessed protuberance, of which the protuberance of one hand is adapted to be seated in said recess and of which the other protuberance is adapted to be seated in the protuberance of the first mentioned hand through the influence of gravity upon the proper manipulation of the casing.

In testimony whereof, I have hereunto signed my name.

ELIAS FREDERIC SLEAR.

Witnesses:
C. F. EGGLESTON,
FRANK A. MOOREHEAD.

---

Copies of this patent may be obtained for five cents each, by addressing the "Commissioner of Patents, Washington, D. C."